United States Patent
Braeuchle

(10) Patent No.: US 10,126,133 B2
(45) Date of Patent: Nov. 13, 2018

(54) DRIVER ASSISTANCE SERVICE

(71) Applicant: Robert Bosch GmbH, Stuttgart (DE)

(72) Inventor: Christian Braeuchle, Hassmersheim-Hochhausen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 89 days.

(21) Appl. No.: 13/734,198

(22) Filed: Jan. 4, 2013

(65) Prior Publication Data
US 2013/0179077 A1 Jul. 11, 2013

(30) Foreign Application Priority Data
Jan. 5, 2012 (DE) .................. 10 2012 200 126

(51) Int. Cl.
| | | |
|---|---|---|
| G08G 1/123 | (2006.01) | |
| G08G 1/16 | (2006.01) | |
| G01C 21/26 | (2006.01) | |
| B60R 22/00 | (2006.01) | |
| G05D 1/00 | (2006.01) | |
| G05D 3/00 | (2006.01) | |
| G06F 7/00 | (2006.01) | |
| G06F 17/00 | (2006.01) | |
| G06F 17/10 | (2006.01) | |
| G06G 7/78 | (2006.01) | |
| B60Q 1/00 | (2006.01) | |

(52) U.S. Cl.
CPC ............. *G01C 21/26* (2013.01); *G08G 1/161* (2013.01); *G08G 1/162* (2013.01)

(58) Field of Classification Search
CPC ........ G08G 1/16; B60W 30/09; B60W 30/14; B60Q 9/008; B60T 2201/022; G01S 5/0072
USPC .................. 340/903, 436; 701/47, 301, 538; 999/903
See application file for complete search history.

(56) References Cited

U.S. PATENT DOCUMENTS

| | | | |
|---|---|---|---|
| 6,243,025 B1 * | 6/2001 | Yamagata ............. | G01S 13/931 340/903 |
| 2009/0072996 A1 * | 3/2009 | Schoepp ....................... | 340/903 |
| 2010/0209892 A1 * | 8/2010 | Lin ....................... | G09B 19/167 434/71 |
| 2011/0035150 A1 * | 2/2011 | Sundarraj ............. | G01S 5/0072 701/301 |
| 2011/0106444 A1 | 5/2011 | Adachi et al. | |
| 2012/0310518 A1 * | 12/2012 | Chen ...................... | G08G 1/162 701/301 |

(Continued)

FOREIGN PATENT DOCUMENTS

| | | |
|---|---|---|
| CN | 101398977 A | 4/2009 |
| CN | 101823486 A | 9/2010 |
| CN | 102076542 A | 5/2011 |

(Continued)

*Primary Examiner* — Mahmoud S Ismail
(74) *Attorney, Agent, or Firm* — Norton Rose Fulbright US LLP; Gerard Messina

(57) ABSTRACT

A method for providing a driver assistance service includes the steps of determining a first measured value for a first measured variable using a first measuring device, which is situated onboard a first motor vehicle, of transmitting the first measured value to a second motor vehicle and of providing the driver assistance service in the second motor vehicle based on the transmitted first measured value.

17 Claims, 2 Drawing Sheets

(56) References Cited

U.S. PATENT DOCUMENTS

2013/0093582 A1* 4/2013 Walsh et al. .................. 340/436

FOREIGN PATENT DOCUMENTS

| CN | 102184644 A | 9/2011 |
| CN | 104047698 A | 9/2014 |

* cited by examiner

DRIVER ASSISTANCE SERVICE

CROSS REFERENCE

The present application claims the benefit under 35 U.S.C. § 119 of German Patent Application No. DE 102012200126.3 filed on Jan. 5, 2012, which is expressly incorporated herein by reference in its entirety.

FIELD

The present invention relates to a driver assistance service. The present invention particularly relates to a method and devices for providing a driver assistance service onboard a motor vehicle.

BACKGROUND INFORMATION

A driver assistance system onboard a motor vehicle scans a number of measuring values in the area of the motor vehicle and provides a signal so as to make things easier for a driver in driving the motor vehicle. One conventional driver assistance system includes a distance assistant, which maintains a predetermined speed of the motor vehicle, as long as a predetermined distance from a preceding vehicle is maintained. For this, the distance is determined using a radar sensor, for example, and the speed is throttled perhaps to the extent that a rear-end collision based on too small a distance is able to be avoided.

Another driver assistance system relates to a parking assistant which, during a parking process, signals the driver of the motor vehicle when a predetermined safety distance from an obstacle in the area of the motor vehicle has been undershot.

In general, the function of such a driver assistance system is limited to measured values which are collected onboard the motor vehicle. Measured values once raised, however, on the other hand, may be put in as the base of the function of several different driver assistance systems.

The present invention is based on stating a service which implements a driver assistance system, the provision of the service being set on a broadened base of measured values.

SUMMARY

An example method for providing a driver assistance service in accordance with the present invention includes the steps of determining a first measured value for a first measured variable using a first measuring device which is situated onboard a first motor vehicle, transmitting the first measured value to a second motor vehicle, and providing the driver assistance service in the second motor vehicle based on the transmitted first measured value.

The driver assistance service may advantageously make use, in the second motor vehicle, of an unprocessed measured value that was not collected onboard the second motor vehicle. The first motor vehicle is preferably situated in a predetermined region around the second motor vehicle, and the transmission of the first measured value takes place directly between the motor vehicles. Thus, data traffic between the motor vehicles may be reduced, and the relevance of the first measured value for the second motor vehicle may be increased, based on the spatial proximity of the two motor vehicles.

In one preferred specific embodiment, the driver assistance service onboard the second motor vehicle is provided, furthermore, based on a second measured value. For this purpose, using a second measuring device which is situated onboard the second motor vehicle, a second measured value is determined for the second measured variable. Therefore, it is possible to utilize the driver assistance service even if there is no first motor vehicle in the predetermined area about the second motor vehicle.

The first and the second measured value may refer to the same measured variable, and providing it may include the validation of the measured values against each other. The measured values may be, for example, the distance between the two motor vehicles. By the determination of the same measured variable using different measuring devices onboard the different motor vehicles and the subsequent validation of the measured values, measuring errors are able to be lowered, and the failure of one of the measuring devices is able to be detected and compensated for.

If the first and the second measured value relate to the same measured variable, the provision may include a determination of a combined measured variable based on the two measured values, so that the accuracy of the combined measured value is greater than the accuracy of the first and the second measured value. The measured variable may thus be determined at improved accuracy. The driver assistance service may thus also be usable for a purpose which requires a particularly accurate and reliable measurement, such as a braking assistant which independently operates the brake of the second motor vehicle based on measured values for the distance between the motor vehicles.

In another specific embodiment, the second motor vehicle does not have the possibility of determining the first measured value. The driver assistance service may then be offered only if a suitable first motor vehicle is in the transmission area of the second motor vehicle. On the one hand, in this way, one may save the installation of a possibly expensive sensor onboard the second motor vehicle. On the other hand, this specific embodiment is advantageous if, for physical reasons, the first measured variable cannot be collected onboard the second motor vehicle.

If, for example, the second motor vehicle is traveling after the first motor vehicle, the first measured variable may refer to the distance between the first motor vehicle and a third vehicle driving ahead. The driver assistance service may indicate to the driver of the second motor vehicle whether, after a passing maneuver, the driver will be able safely to get back in lane in front of the first motor vehicle. Since the distance of the first motor vehicle from the third motor vehicle cannot be examined from the position of the second motor vehicle, it is meaningful to limit the function of this driver assistance service to determining the distance onboard the first motor vehicle.

In one specific embodiment of the method, the second motor vehicle transmits a request for the first measured value to the first motor vehicle, before it transmits the measured value back to the second motor vehicle. The data traffic between the motor vehicles may thereby be reduced, so that an available bandwidth between the motor vehicles is able to be usable in an improved manner.

In another specific embodiment, the first measured value is sent out periodically onboard the first motor vehicle to transmit it. In particular, if the first measured value is of general interest, is to be frequently renewed, or points to danger in the area of the first motor vehicle, rapid transmission to the second motor vehicle may be ensured in that manner.

In one specific embodiment, the first measured value is only emitted if it is determined onboard the first motor vehicle that the measured value is relevant onboard the second motor vehicle. The transmission of not needed and irrelevant data from the first to the second motor vehicle may thus be reduced.

The example method may be implemented in the form of a computer program product having program code. In this context, the computer program product may run on a processing unit or may be stored on a computer-readable data carrier.

One example device, according to the present invention, for transmitting a measured value from a first motor vehicle includes a measuring device for determining a first measured value, and a transmitting device for sending out the measured value to a second motor vehicle.

A corresponding example device for providing a driver assistance service onboard a second motor vehicle, according to the present invention, includes a receiving device for receiving a first measured value sent out by a first motor vehicle, and a processing device for providing the driver assistance service based on the first measured value.

The devices described form a system with one another that is equipped to implement the method described.

BRIEF DESCRIPTION OF THE DRAWINGS

Example embodiments of the present invention are described below in detail with reference to the figures.

DETAILED DESCRIPTION OF EXAMPLE EMBODIMENTS

Figure 1:
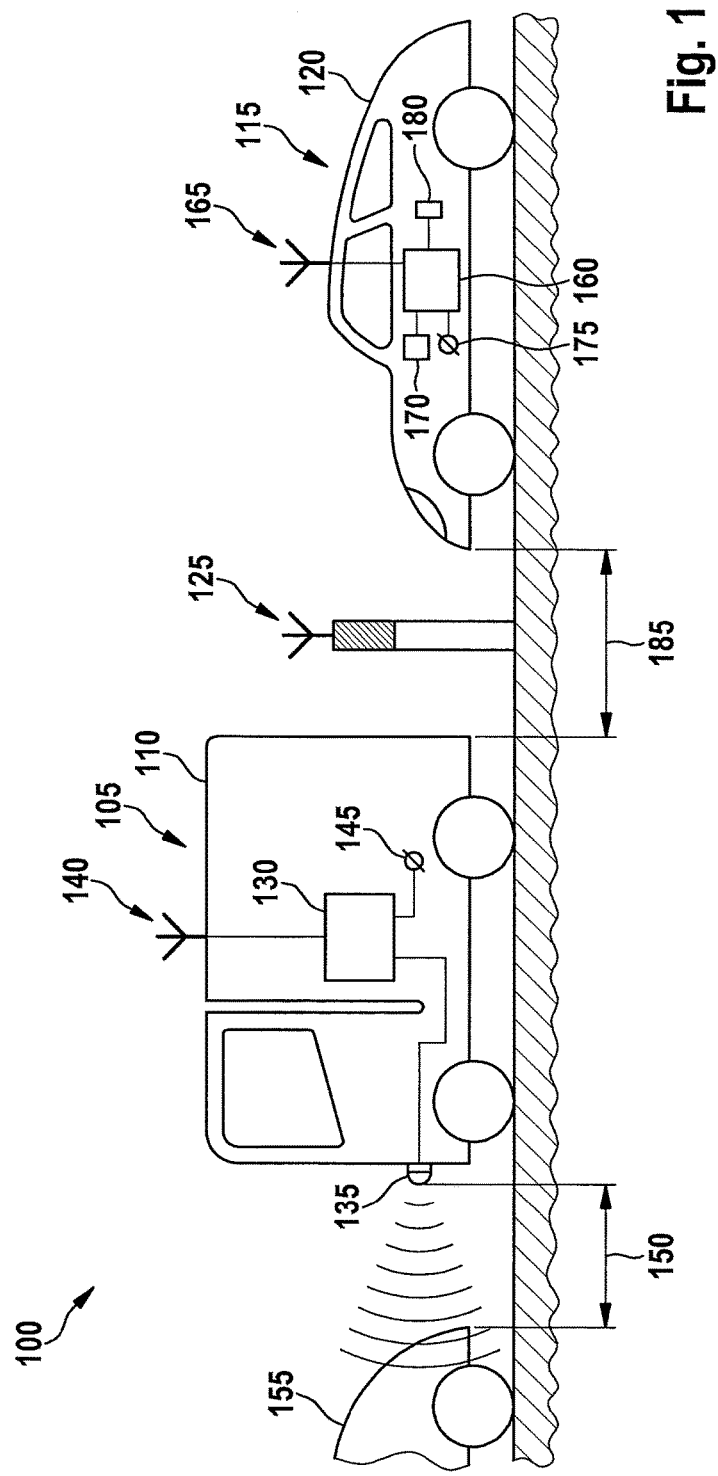
FIG. 1 shows a system for providing a driver assistance service.

FIG. 1 shows a system 100 for providing a driver assistance service. System 100 includes a first device 105 onboard a first motor vehicle 110, a second device 115 onboard a second motor vehicle 120, and optionally a switching system 125 for data transmission between motor vehicles 110 and 120.

First device 105 includes a first processing device 130, which is connected to a first sensor 135 and a first transmitting device 140. Optionally, first processing device 130 may also be connected to a first interface 145.

First processing device 130 is preferably formed by a programmable microcomputer, which, in one specific embodiment, is further able to look after other control or measuring tasks, such as providing a driver assistance service for first motor vehicle 110.

First sensor 135 is equipped to take up a first measured variable 150. First measured variable 150 may, for instance, refer to the distance between first motor vehicle 110 and a third vehicle 155 traveling ahead. First measured variable 150 may, however, also refer to any other physical measured variable in the area of first motor vehicle 110.

First transmitting device 140 is equipped to emit data to the surroundings of first motor vehicle 110. First transmitting device 140 is preferably also equipped to receive data. The transmission preferably takes place in a wireless manner, for instance, using electromagnetic waves or visible or invisible light.

First interface 145 is equipped to accept data, onboard first motor vehicle 110, which are able to contribute to determining measured value 150. For example, sensor 135 may include a radar sensor and first interface 145 may be equipped to accept acceleration values of first motor vehicle 110, processing device 130 determining first measured value 150 based on the values of radar sensor 135 and of acceleration values in an improved manner.

The measured value, provided by processing device 130, preferably directly reflects first measured value 150 and does not represent a composite value which is not able to be recorded directly.

The determined measured value is emitted using transmitting device 140, for transmission to second motor vehicle 120. The transmission may take place directly between motor vehicles 110, 120 or developed via transmitting system 125. In the direct transmission one speaks of car-to-car communication (C2C), while transmission via switching system 125 is designated as Car-to-Infrastructure communication (C2I). Switching system 125 may be implemented, for example in the form of stationary sensing and receiving devices or a radio network.

Second device 115 includes a second processing device 160, which is connected to a second transmitting device 160 and an output device 170. Furthermore, second processing device 160 may be connected to a second interface 175 and or a second sensor 180.

Second device 115 includes a second processing device is generally designed and usable in the same way as first processing device 130 onboard first motor vehicle 110. Second transmitting device 165 is equipped at least for receiving data, but preferably also for sending out data. Depending on the possibilities of first transmitting device 140 and possibly of switching system 125, a unidirectional or bidirectional data connection is thus able to be produced between motor vehicles 110 and 120.

Output device 170 is equipped to output a signal to a driver or to a control system of the second motor vehicle 120. The output to the driver may be made optically, haptically and/or acoustically, for example.

The driver assistance service onboard second motor vehicle 120 may apply to a number of different aims. In one specific embodiment, the driver assistance service implements a parking assistance, in another specific embodiment it implements a distance assistance for maintaining a predetermined safety distance from preceding motor vehicle 110. Other assistance services or convenience functions may also be included.

If the assistance service is also to be available onboard second motor vehicle 120 when no data have been received from first motor vehicle 110 using second transmitting device 165, the service may be provided based on data that have been received via second interface 175 and/or a second measured variable 185 that was determined using second sensor 180.

The arrangement of vehicles 110, 120 and, if necessary, 155, the position of transmitting system 125 and drawn-in measured quantities 150 and 185 should be understood to be purely exemplarily.

Figure 2:
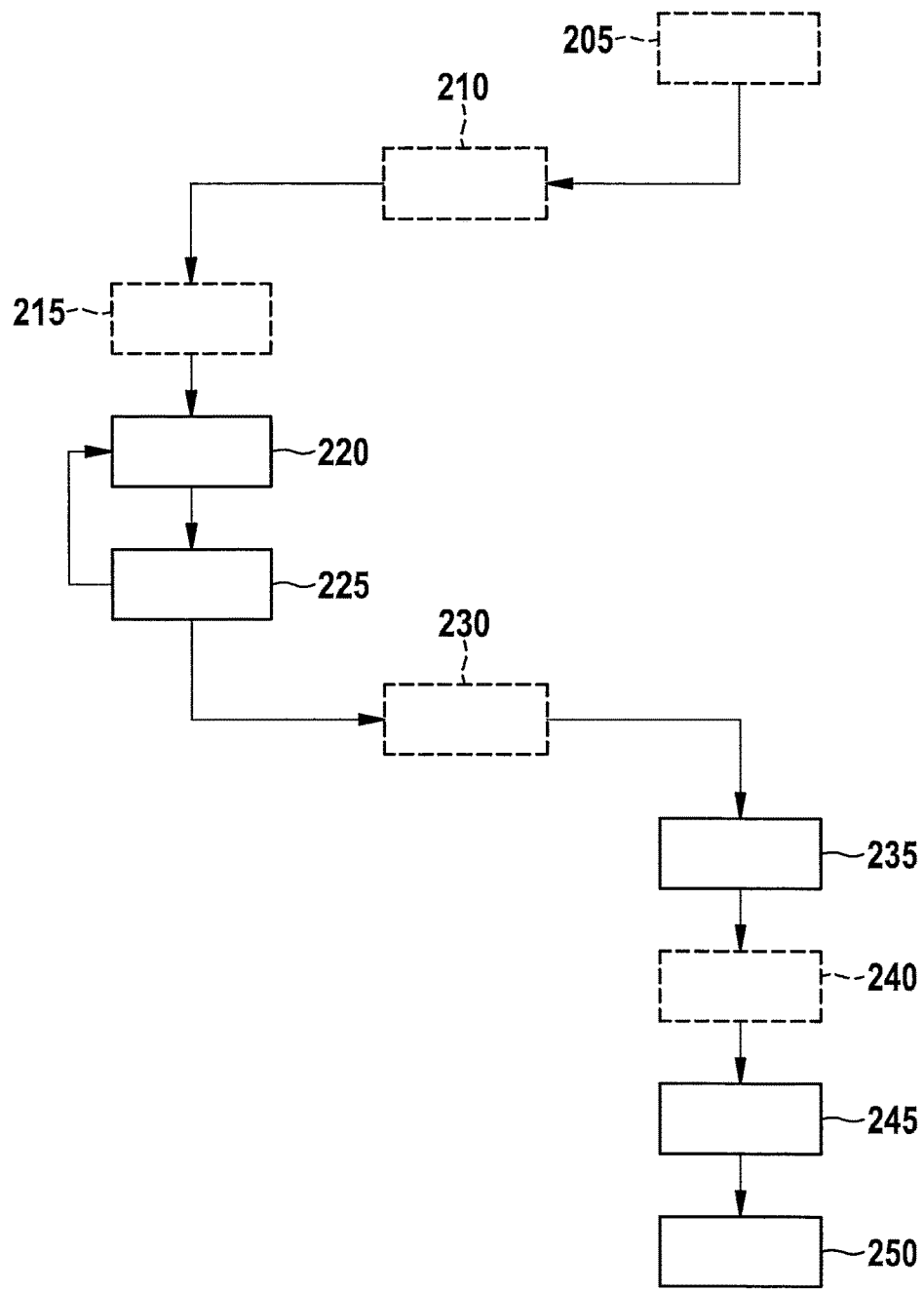
FIG. 2 shows a flow chart of a method for providing the driver assistance service.

FIG. 2 shows a flow chart of a method 200 for providing the driver assistance service described above. For the sake of clarity, steps arranged in the left area of FIG. 2 are associated with vehicle 110 of FIG. 1, steps arranged in the middle area of FIG. 2 are associated with optional transmitting system 125, and steps arranged in the right area are associated with second vehicle 120 of FIG. 1. Steps edged by dashed lines refer to those which could optionally also be omitted.

In a first step 205 a query for the first measured value is sent by second motor vehicle 120 using second transmitting device 165. The query may be transmitted to transmitting system 125, which further transmits it, in a step 210, to first motor vehicle 110, or step 210 may be omitted and the transmission takes place directly from second motor vehicle 120 to first motor vehicle 110.

In a step 215, the query for the first measured value is received onboard first motor vehicle 110 using first transmitting device 140.

In a subsequent step 220, first measured variable 150 is scanned onboard first motor vehicle 110, so as to determine the first measured value. The determination of the first measured value may also include taking into account even further measured values or data, as is described above with reference to FIG. 1.

In one variant of method 300, it may additionally be determined whether the measured variable is of importance or of interest onboard second motor vehicle 120. The determination may be carried out based on a communication, that is not shown, between motor vehicles 110 and 120, or based on an estimate on the part of first motor vehicle 110. If there is no interest or relevance, the first measured value determined is not transmitted to second motor vehicle 120.

Subsequently, in a step 225, the determined first measured value is sent out using first transmitting device 140. As is indicated by the arrow returning to step 220, the determination and the sending out of the first measured value may also take place in a cyclical manner, for instance, controlled by time.

This specific embodiment is particularly advantageous if steps 205 and 210 drop out.

Either directly or in an optional step 230, which, in a reversed direction, corresponds to step 210, the first measured value is transmitted to second motor vehicle 120.

In a subsequent step 235, the first measured value is received onboard second motor vehicle 120 using second transmitting device 165.

If the driver assistance service, that is to be effected onboard second motor vehicle 120, is based additionally on a second measured variable 185 that is to be collected locally, this second measured value may be determined in an optional step 240. In another specific embodiment, step 240 may also be carried out before step 235 and perhaps even before step 205, onboard second motor vehicle 120.

In a subsequent step 245, the measured value(s) is/are processed using second processing device 160. If the measured values refer to the same measured variable, the measured values may be validated against each other, or a combined measured value may be formed to increase the accuracy of the determination. Particularly in the determination of a plurality of first and second measured values, the respective standard deviations may be determined by second processing device 160, whereby the individual measured values may be combined with each other while increasing the accuracy.

The measured values may also refer to different measured variables 150, 185. In the case of the missing of the first measured value, the provision of the driver assistance service onboard second motor vehicle 120 may be continued in different specific embodiments or not carried out. In one specific embodiment, the driver assistance service is carried on at reduced accuracy, reliability or meaningfulness, if the first measured value is not present.

Based on the processing in step 245, in a subsequent step 250 a signal is output, using an output device 170, which acts on a driver or a control system of second motor vehicle 120.

The designs of method 200 shown in FIG. 2 include transmitting measured values of a first measured variable from a plurality of first motor vehicles 110 to second motor vehicle 120, first measured variables 150 being associated with individual first motor vehicles 110 or being able to refer to common facts of the case. Furthermore, transmitting measured values, which refer to first measured variable 150, from a first motor vehicle 120 to a plurality of second motor vehicles 120, is also possible.

What is claimed is:

1. A method for providing a driver assistance service, comprising:
   determining a first distance value for a first measured variable using a first measuring device, the first measuring device being situated onboard a first motor vehicle;
   transmitting, with a transmitting device, the first distance value to a second motor vehicle, the transmitting device being situated onboard the first motor vehicle; and
   providing, with a processing device, the driver assistance service in the second motor vehicle based on the transmitted first distance value, wherein the first distance value is expressed in terms of a unit of distance measurement, wherein the first distance value measures a distance from the first motor vehicle to a third motor vehicle that is different than the second motor vehicle.

2. The method as recited in claim 1, further comprising:
   determining a second distance value for a second measured variable using a second measuring device, the second measuring device being situated onboard the second motor vehicle, wherein the driver assistance service is provided based on the first and the second distance value.

3. The method as recited in claim 2, wherein the first and the second distance value refer to a same measured variable, and wherein the providing of the driver assistance service includes validating the first distance value and the second distance value against each other.

4. The method as recited in claim 2, wherein the first distance value and the second distance value relate to a same measured variable, and wherein the providing of the driver assistance system includes determining a combined distance value based on the first distance values and the second distance value, so that accuracy of the combined distance value is greater than an accuracy of the first distance value and the second distance value.

5. The method as recited in claim 1, wherein the first measured variable is not ascertainable onboard the second motor vehicle for physical reasons.

6. The method as recited in claim 1, further comprising:
   transmitting a query for the first distance value by the second motor vehicle to the first motor vehicle prior to the transmitting of the first distance value.

7. The method as recited in claim 1, wherein the first distance value is periodically output onboard the first motor vehicle in order to transmit the first distance value.

8. The method as recited in claim 1, wherein the first distance value is emitted only if it is determined onboard the first motor vehicle that the first distance value is relevant onboard the second motor vehicle.

9. A non-transitory computer readable storage medium storing program code for providing a driver assistance service, the program code, when executed by a processing device causes the processing device to perform the steps of:
   determining a first distance value for a first measured variable using a first measuring device, the first measuring device being situated onboard a first motor vehicle;
   transmitting, with a transmitting device, the first distance value to a second motor vehicle, the transmitting device being situated onboard the first motor vehicle; and providing, with the processing device, the driver assistance service in the second motor vehicle based on the transmitted first distance value, wherein the first distance value is expressed in terms of a unit of distance measurement, wherein the first distance value measures a distance from the first motor vehicle to a third motor vehicle that is different than the second motor vehicle.

10. A device for providing a driver assistance service onboard a second motor vehicle, comprising:

a receiving device configured to receive a first distance value that has been sent from a first motor vehicle; and a processing device to provide the driver assistance service based on the received first distance value, wherein the first distance value is expressed in terms of a unit of distance measurement, wherein the first distance value measures a distance from the first motor vehicle to a third motor vehicle that is different than the second motor vehicle.

11. The method as recited in claim 1, wherein the processing device is situated onboard the second motor vehicle.

12. A system for providing a driver assistance service, comprising:

a first measuring device configured to determine a first distance value, the first measuring device being situated onboard a first motor vehicle;

a transmitting device configured to send the first distance value to a second motor vehicle, the transmitting device being situated onboard the first motor vehicle;

a receiving device configured to receive the first distance value that has been sent from the first motor vehicle, the receiving device being situated onboard the second motor vehicle; and a processing device configured to provide the driver assistance service for the second motor vehicle based on the received first distance value, the processing device being situated onboard the second motor vehicle, wherein the first distance value is expressed in terms of a unit of distance measurement, wherein the first distance value measures a distance from the first motor vehicle to a third motor vehicle that is different than the second motor vehicle.

13. The system of claim 12, wherein the driver assistance service is provided independently of the second motor vehicle's driver.

14. The method of claim 1, wherein the driver assistance service is provided independently of the second motor vehicle's driver.

15. The non-transitory computer readable storage medium of claim 9, wherein the driver assistance service is provided independently of the second motor vehicle's driver.

16. The device of claim 10, wherein the driver assistance service is provided independently of the second motor vehicle's driver.

17. The method as recited in claim 1, wherein the third motor vehicle is in front of the first motor vehicle, and wherein the second motor vehicle is behind the first motor vehicle.

* * * * *